(12) United States Patent
Cheng et al.

(10) Patent No.: US 8,931,026 B2
(45) Date of Patent: Jan. 6, 2015

(54) APPARATUS AND METHOD FOR DETECTING SPECTRUM INVERSION

(71) Applicant: MStar Semiconductor, Inc., Hsinchu Hsien (TW)

(72) Inventors: Kai-Wen Cheng, Zhubei (TW); Yi-Ying Liao, Taipei (TW); Tung-Sheng Lin, Taoyuan (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 61 days.

(21) Appl. No.: 13/900,821

(22) Filed: May 23, 2013

(65) Prior Publication Data

US 2013/0318557 A1 Nov. 28, 2013

(30) Foreign Application Priority Data

May 24, 2012 (TW) .............................. 101118577 A

(51) Int. Cl.
*H04N 7/173* (2011.01)
*H04N 21/61* (2011.01)
*H04N 7/20* (2006.01)
*H04L 27/00* (2006.01)

(52) U.S. Cl.
CPC ............. *H04N 21/6143* (2013.01); *H04N 7/20* (2013.01); *H04L 27/00* (2013.01); *H04L 27/006* (2013.01)
USPC .............................. 725/116; 725/70; 725/146

(58) Field of Classification Search
USPC ........................................... 725/70, 116, 146
See application file for complete search history.

(56) References Cited

U.S. PATENT DOCUMENTS

| | | | |
|---|---|---|---|
| 8,203,652 B2 * | 6/2012 | Lin ................................ | 348/529 |
| 8,482,078 B2 * | 7/2013 | Cheng et al. ................... | 257/369 |
| 8,824,528 B2 * | 9/2014 | Ban et al. ....................... | 375/150 |
| 2013/0133020 A1 * | 5/2013 | Feng et al. ..................... | 725/131 |

* cited by examiner

*Primary Examiner* — Hunter B Lonsberry
(74) *Attorney, Agent, or Firm* — Edell, Shapiro & Finnan, LLC

(57) ABSTRACT

An apparatus for detecting spectrum inversion includes a different correlator and a determining module. The differential correlator performs an odd-order differential correlation on an input signal and a known signal to generate a differential correlation result. When the input signal is determined as corresponding to a target signal of the known signal, the determining module detects spectrum inversion in the input signal according to the phase of the differential correlation result.

24 Claims, 3 Drawing Sheets

Without spectrum inversion:

|  | Arg ($d_1$) | Arg ($d_2$) | Arg ($d_3$) | Arg ($d_4$) |
|---|---|---|---|---|
| AWGN SNR = 20dB<br>\|CFO\| < 0.005*SR | 0.002π | 0.002π | 0.005π | 0.009π |
| AWGN SNR = 10dB<br>\|CFO\| < 0.005*SR | 0.006π | 0.007π | 0.010π | 0.006π |
| AWGN SNR = 5dB<br>\|CFO\| < 0.005*SR | 0.010π | 0.012π | 0.025π | 0.015π |

FIG. 3A

With spectrum inversion:

|  | Arg ($d_1$) | Arg ($d_2$) | Arg ($d_3$) | Arg ($d_4$) |
|---|---|---|---|---|
| AWGN SNR = 20dB<br>\|CFO\| < 0.005*SR | 0.998π | 0.002π | 0.995π | 0.009π |
| AWGN SNR = 10dB<br>\|CFO\| < 0.005*SR | 0.998π | 0.002π | 0.998π | 0.015π |
| AWGN SNR = 5dB<br>\|CFO\| < 0.005*SR | 0.990π | 0.015π | 0.960π | 0.002π |

FIG. 3B

APPARATUS AND METHOD FOR DETECTING SPECTRUM INVERSION

This application claims the benefit of Taiwan application Ser. No. 101118577, filed May 24, 2012, the subject matter of which is incorporated herein by reference.

BACKGROUND OF THE INVENTION

1. Field of the Invention

The invention relates in general to a wireless communication technique, and more particularly, to a technique for detecting spectrum inversion in a wireless communication signal.

2. Description of the Related Art

With advancements in communication techniques, digital television broadcasting continues to mature. Apart from being transmitted via cables, digital television signals can also be transmitted in a form of wireless signals via a base station or a satellite. The Digital Video Broadcasting-Satellite (DVB-S) and the Digital Video Broadcasting-Satellite-Second Generation (DVB-S2) are prevalent standards in digital television broadcasting.

In the DVB-S2 specifications, an input signal received at a baseband demodulator at a digital television signal receiving end is a signal that is processed by $\pi/2$-shifted binary phase shift keying (BPSK), and is composed of an in-phase component and a quadrature component. In practice, a tuner and a mixer at a DVB-S2 receiving end may misinterpret the in-phase component and the quadrature component as each other—such a situation is referred to as spectrum inversion. If such a situation is not timely detected by the baseband demodulator, an activation failure of a television system may occur even after having had already performed numerous signal processing procedures. To correct the activation failure, the in-phase component and the quadrature component need to be exchanged, followed by repetition of the same signal processing procedures. It is obvious, therefore, that the issue of spectrum inversion may severely delay a power-on time of the television system.

SUMMARY OF THE INVENTION

The invention is directed to an apparatus and method for detecting spectrum inversion. In the apparatus and method for detecting spectrum inversion of the present invention, an odd-order differential correlation is performed on an input signal, and spectrum inversion in the input signal is detected according to the phase of the correlation result. The apparatus and method for determining spectrum inversion of the present invention is applicable to not only a DVB-S2 compliant digital signal receiving end but also other systems with signals having similar characteristics.

According to an embodiment the present invention, an apparatus for detecting spectrum inversion is provided. The apparatus for detecting spectrum inversion includes a differential correlator and a determining module. The differential correlator performs an odd-order differential correlation on an input signal and a known signal to generate a differential correlation result. When the input signal is determined as corresponding to a target signal of the known signal, the determining module detects spectrum inversion in the input signal according to a phase of the differential correlation result.

According to another embodiment of the present invention, a method for detecting spectrum inversion is provided. The method includes steps of: performing an odd-order differential correlation on an input signal and a known signal to generate a differential correlation result; and when the input signal is determined as corresponding to a target signal of the known signal, detecting spectrum inversion in the input signal according to a phase of the differential correlation result.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 3A and FIG. 3B are simulation results obtained by employing a solution of the present invention.

DETAILED DESCRIPTION OF THE INVENTION

Figure 1:
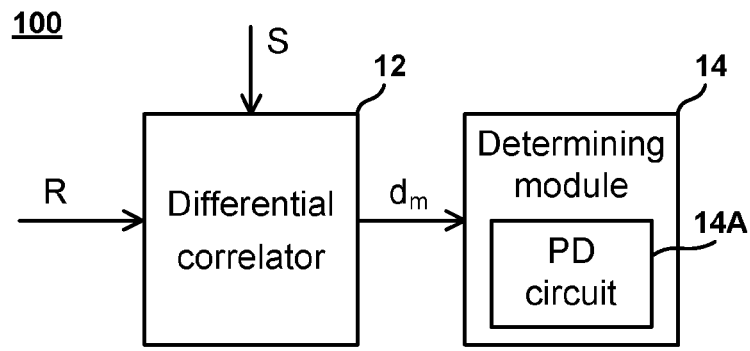
FIG. 1 is a block diagram of a spectrum inversion determining apparatus according to an embodiment of the present invention.

FIG. 1 shows a spectrum inversion determining apparatus 100 according to an embodiment of the present invention. The spectrum inversion determining apparatus 100 includes a differential correlator 12 and a determining module 14. In practice, the spectrum inversion determining apparatus 100 may be integrated into a DVB-S2 compliant digital signal receiving end, but apparatus 100 is not limited to such an application.

According to DVB-S2 specifications, a start of frame (SOF) of a data frame includes 26 symbols $S_0$ to $S_{25}$. In 13 symbols $S_0, S_2, S_6 \ldots$ and $S_{24}$ out of the 26 symbols, the in-phase component and the quadrature component have a same volume and a same sign. Further, in 13 symbols $S_1, S_3, S_5 \ldots$ and $S_{25}$ out of the 26 symbols, the in-phase component and the quadrature component have a same volume but different signs. To express the symbols on a complex plane, the symbols $S_0, S_2, S_6 \ldots$ and $S_{24}$ appear in the first quadrant or the third quadrant, whereas the symbols $S_1, S_3, S_5 \ldots$ and $S_{25}$ appear in the second quadrant or the fourth quadrant.

Based on the above symbol characteristics, the quadrants of the symbols $S_0, S_2, S_4 \ldots$ and $S_{24}$ remain unchanged even in a situation of spectrum inversion, i.e., the quadrants of the symbols $S_0, S_2, S_4 \ldots$ and $S_{24}$ stay in the first or third quadrant. However, the symbols $S_1, S_3, S_5 \ldots$ and $S_{25}$ will have changed to other quadrants due to the spectrum inversion. More specifically, the symbol originally in the second quadrant before the inversion appears in the fourth quadrant after the inversion, and the symbol originally in the fourth quadrant before the inversion appears in the second quadrant after the inversion. In other words, in a situation of spectrum inversion, the symbols $S_0, S_2, S_4 \ldots$ and $S_{24}$ in the SOF of the DVB-S2 data frame remain unchanged; however, the symbols $S_1, S_3, S_5 \ldots$ and $S_{25}$ after the spectrum inversion and the symbols $S_1, S_3, S_5 \ldots$ and $S_{25}$ before the spectrum inversion differ by a negative sign.

Standard SOF contents of the DVB-S2 data frame are known data to a receiving end. Thus, the spectrum inversion determining apparatus 100 may set a known signal S, including the standard SOF contents $S_0$ to $S_{25}$ of the DVB-S2 data frame, as a reference. In the descriptions below, assume that the spectrum inversion determining apparatus 100 already confirms that an input signal R is the SOF of a particular DVB-S2 data frame but is unsure of whether spectrum inversion has occurred in the input signal R.

If no spectrum inversion has occurred in the input signal R, a relation between an $i^{th}$ symbol $r_i$ in the input signal R and an $i^{th}$ signal $s_i$ in a known signal S is:

$$r_i = s_i e^{j2\pi f(iT)} \text{ for } i = 0, 1, 2, 3, \ldots, (N-1) \quad \text{Equation (1)}$$

where T represents a period length of the symbols, f represents a carrier frequency offset of the input signal R at the time the input signal R enters the differential correlator 12, and N represents a respective number of symbols in the input signal R and the known signal S (equal to 26 in this example).

After receiving the input signal R, the differential correlator 12 performs at least one odd-order differential correlation on the input signal R and the known signal S. In this embodiment, the formula below represents a one-order differential correlation for the differential correlator 12 to generate a differential correlation result d1:

$$d_1 = \sum_{i=1}^{N-1} r_i^* s_i r_{i-1} s_{i-1}^* \quad \text{Equation (2)}$$

According to Equation (1), Equation (2) is simplified as:

$$d_1 = (s_1^* s_1 s_0 s_0^* + s_2^* s_2 s_1 s_1^* + \ldots + s_{25}^* s_{25} s_{24} s_{24}^*) \cdot e^{-j2\pi fT} \quad \text{Equation (3)}$$

$$= (|s_1|^2 |s_0|^2 + |s_2|^2 |s_1|^2 + \ldots + |s_{25}|^2 |s_{24}|^2) \cdot e^{-j2\pi fT}$$

It is seen from Equation (3) that, when no spectrum inversion has occurred in the input signal R, the phase of the differential correlation result $\text{Arg}(d_1)$ is $(-2\pi fT)$; $\text{Arg}(d_1)$ also approximates zero as the carrier frequency offset f approximates zero. In practice, the spectrum inversion determining apparatus 100 may be arranged after a carrier frequency offset correcting apparatus for minimizing the frequency carrier offset f.

Conversely, when spectrum inversion has occurred in the input signal R, the relation between the $i^{th}$ symbol $r_i$ in the input signal R and the $i^{th}$ signal $s_i$ in a known signal S is:

$$\begin{cases} r_i = s_i e^{j2\pi f(iT)} & \text{for } i = 0, 2, 4, 6, 8 \ldots \\ r_i = s_i e^{j2\pi f(iT)} \cdot e^{j\pi} & \text{for } i = 1, 3, 5, 7, 9 \ldots \end{cases} \quad \text{Equation (4)}$$

By rewriting Equation (2) according to Equation (4):

$$d_1 = (s_1^* s_1 s_0 s_0^* + s_2^* s_2 s_1 s_1^* + \ldots + s_{25}^* s_{25} s_{24} s_{24}^*) \cdot e^{-j2\pi fT} \cdot e^{j\pi} \quad \text{Equation (5)}$$

$$= (|s_1|^2 |s_0|^2 + |s_2|^2 |s_1|^2 + \ldots + |s_{25}|^2 |s_{24}|^2) \cdot e^{-j2\pi fT} \cdot e^{j\pi}$$

It is seen from Equation (5) that, when spectrum inversion has occurred in the input signal R, the phase of the differential correlation result $\text{Arg}(d_1)$ is $(-2\pi fT + \pi)$; $\text{Arg}(d_1)$ approximates $\pi$ as the carrier frequency offset f approximates zero.

As shown in FIG. 1, the determining module 14 may include a phase detecting circuit 14A for determining the phase $\text{Arg}(d_1)$ of the differential correlation result $d_1$. The determining module 14 may then detect spectrum inversion in the input signal R according to the phase $\text{Arg}(d_1)$ of the differential correlation result $d_1$. For example, the determining module 14 may set a threshold $\pi/2$, and determines that no spectrum inversion has occurred in an input signal when the phase $\text{Arg}(d_1)$ corresponding to the input signal is smaller than the threshold $\pi/2$. Conversely, when the phase $\text{Arg}(d_1)$ corresponding to an input signal is greater than the threshold $\pi/2$, the determining module 14 informs a subsequent circuit to exchange the in-phase component and the quadrature component.

In practice, when receiving an input signal, the spectrum inversion determining apparatus 100 may be unsure of whether the received input signal is an SOF of a specific DVB-S2 data frame. Theoretically, when an input signal is an SOF of a DVB-S2 data frame, the input signal and the known signal should be highly correlated such that an absolute value of the differential correlation result $d_1$ exceeds a predetermined threshold. Conversely, when an input signal is not an SOF of a DVB-S2 data frame, the absolute value of the differential correlation result $d_1$ should be smaller than the threshold. Therefore, the differential correlation result $d_1$ generated by the differential correlator 12 may be a reference for determining whether an input signal is an SOF of a DVB-S2 data frame.

In conclusion, for an input signal, the determining module 14 first determines whether the input signal is an SOF of a DVB-S2 data frame according to an absolute value $|d_{m1}|$ of the differential correlation result $d_1$ of the input signal. When a determination result is affirmative, the determining module 14 further detects spectrum inversion in the input signal according to the phase $\text{Arg}(d_1)$ of the differential correlation result $d_1$.

It should be noted that, the operation performed by the differential correlator 12 is not limited to the above one-order differential correlation. A different correlation result dm generated by performing an m-order differential correlation on an input signal R and a known signal S can be represented as:

$$d_m = \sum_{i=m}^{N-1} r_i^* s_i r_{i-m} s_{i-m}^* \quad \text{Equation (6)}$$

According to Equation (1), Equation (6) can be simplified as:

$$d_m = (s_m^* s_m s_0 s_0^* + s_{m+1}^* s_{m+1} s_1 s_1^* + \ldots + s_{25}^* s_{25} s_{25-m} s_{25-m}^*) \cdot e^{-j2\pi f(mT)}$$

When m is an even number, the result of Equation (6) can be deduced according to Equation (4) as:

$$d_m = (s_m^* s_m s_0 s_0^* + s_{m+1}^* s_{m+1} s_1 s_1^* + \ldots + s_{25}^* s_{25} s_{25-m} s_{25-m}^*) \cdot e^{-j2\pi f(mT)} \quad \text{Equation (7)}$$

When m is an odd number, the result of Equation (6) can be deduced according to Equation (4) as:

$$d_m = (|s_m|^2 |s_0|^2 + |s_{m+1}|^2 |s_1|^2 + \ldots + |s_{25}|^2 |s_{25-m}|^2) \cdot e^{-j2\pi f(mT)} \cdot e^{j\pi} \quad \text{Equation (8)}$$

It is observed from Equations (7) and (8) that, when m is an even number, the phase $\text{Arg}(d_m)$ of the differential correlation result $d_m$ is $[-2\pi f(mT)]$. When m is an odd number, the Arg$(d_m)$ corresponding to an input signal without spectrum inversion is $[-2\pi f(mT)]$, whereas the $\text{Arg}(d_m)$ corresponding to an input signal with spectrum inversion is $[-2\pi f(mT) + \pi]$. In other words, only odd-order differential correlations generate a differential correlation result responding to whether spectrum inversion has occurred in an input signal. Thus, the differential correlator 12 can be designed as performing at least one odd-order (one-order, three-order, five-order . . . ) differential correlation.

Figure 2:
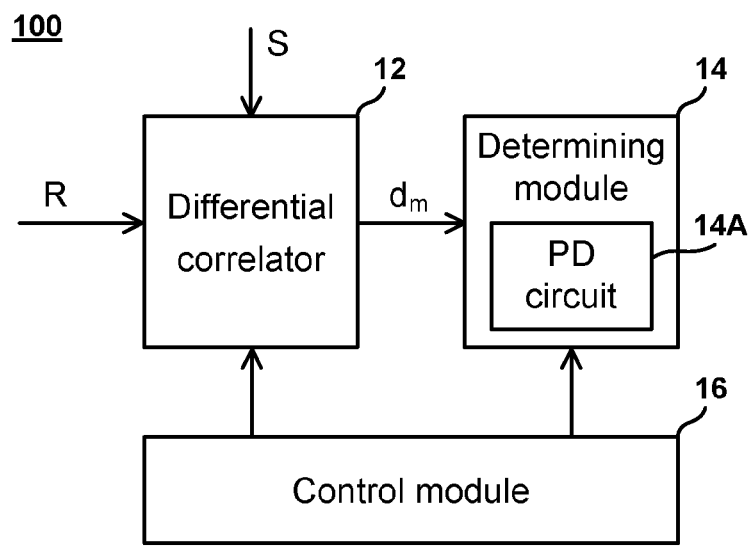
FIG. 2 is a block diagram of a spectrum inversion determining apparatus further including a control module according to an embodiment of the present invention.

In practice, a result generated by a higher-order differential correlation is more accurate. As shown in FIG. 2, the spectrum inversion determining unit 100 may further include a control module 16 for determining an order m to be employed by the differential correlator 12 according to a channel environment passed by an input signal. In order to increase accuracy, the order m selected by the controller 16 gets larger as the channel environment gets poorer. In one embodiment, for a satisfactory channel environment, the control module 16 selects 1 as the order m; for a poor environment, the control module 16 selects 3 as the order m.

In an alternative embodiment, the differential correlator 12 is designed as simultaneously or in sequence performing at least two different odd-order (m1, m2) differential correlations:

$$d_{m1} = \sum_{i=m1}^{N-1} r_i^* s_i r_{i-m1} s_{i-m1}^*$$

and $$d_{m2} = \sum_{i=m2}^{N-1} r_i^* s_i r_{i-m2} s_{i-m2}^*.$$

Correspondingly, the determining module 14 may be designed as detecting spectrum inversion in an input signal by simultaneously referring to a phase $\text{Arg}(d_{m1})$ of a first differential correlation result $d_{m1}$ and a phase $\text{Arg}(d_{m2})$ of a second differential correlation result $d_{m2}$. For example, the determining module 14 may detect spectrum inversion in an input signal according to whether $\text{Arg}(d_{m1})*w1+\text{Arg}(d_{m2})*w2$ is greater than a threshold, wherein w1 and w2 are predetermined ratio parameters. Further, the determining module 14 may also determine whether an input signal is an SOF of a DVB-S2 data frame according to an absolute value $|d_{m1}|$ of the first differential correlation result $d_{m1}$ and an absolute value $|d_{m2}|$ of the second differential correlation result $d_{m2}$ (e.g., a sum of $|d_{m1}|$ and $|dm2|$).

In another embodiment, the differential correlator 12 may be designed as selectively generating the second differential correlation result $d_{m2}$. For example, the control module 16 (which may also be referred to herein as an environment detecting module) may determine whether to generate the second differential correlation result $d_{m2}$ according to a channel environment. When the control module 16 determines that the current channel is poor, the differential correlator 12 additionally generates the second differential correlation result $d_{m2}$, or else the differential correlator generates only the first differential correlation result $d_{m1}$. It is noted that the differential correlator 12, determining module 14, and control module 16 may be implemented with software, hardware or a combination thereof. Software may comprise logic instructions stored in memory that, when executed by a processor, causes the functionality described herein to be effected. Hardware may comprise an application specific integrated circuits (ASIC) embodying logic gates and registers configured to effect the functionality described herein.

In another embodiment, the differential correlator 12 is designed as simultaneously or in sequence performing an odd-order (m1) and an even-order (m3) differential correlations:

$$d_{m1} = \sum_{i=m1}^{N-1} r_i^* s_i r_{i-m1} s_{i-m1}^*$$

and $$d_{m3} = \sum_{i=m3}^{N-1} r_i^* s_i r_{i-m3} s_{i-m3}^*.$$

Taking 1 as m1 and 2 as m3 for example, when spectrum inversion has not occurred in the input signal, the phase $\text{Arg}(d_1)$ of the differential correlation result $d_1$ equals $(-2\pi fT)$, and the phase $\text{Arg}(d_2)$ of the differential correlation result $d_2$ equals $(-4\pi fT)$, with a phase difference being $[\text{Arg}(d_1)-\text{Arg}(d_2)]=(2\pi fT)$. Conversely, when spectrum inversion has occurred in the input signal, the phase $\text{Arg}(d_1)$ of the differential correlation result $d_1$ equals $(-2\pi fT+\pi)$, and the phase $\text{Arg}(d_2)$ of the differential correlation result $d_2$ equals $(-4\pi fT)$, with a phase difference being $[\text{Arg}(d_1)-\text{Arg}(d_2)]=(2\pi fT+\pi)$. Based on the above phase characteristics, since the carrier frequency offset f approximates zero, the determining module 14 may also detect spectrum inversion in the input signal according to a phase difference $[\text{Arg}(d_{m1})-\text{Arg}(d_{m3})]$ between the first difference correlation result $d_{m1}$ and a third difference correlation result $d_{m3}$.

On the other hand, even the phase $\text{Arg}(d_{m3})$ of the third differential correlation result $d_{m3}$ cannot independently serve as basis for detecting spectrum inversion in the input signal, an absolute value $|d_{m3}|$ of the third differential correlation result $d_{m3}$ is still worthy to be referenced. For example, the determining module 14 determines whether the input signal is an SOF of a DVB-S2 data frame according to the absolute value $|d_{m1}|$ of the first differential correlation result $d_{m1}$ and the absolute value $|d_{m3}|$ of third differential correlation result $d_{m3}$ (e.g., a sum of the absolute values $|d_{m1}|$ and $|dm3|$).

In practice, the differential correlator 12 may also be designed as performing multiple odd-order and multiple even-order differential correlations. For example, the differential correlator 12 may simultaneously perform one-order, two-order, third-order and fourth-order differential correlations on an input signal. Under such circumstances, the determining module 14 may determine whether the input signal is an SOF of a DVB-S2 data frame according to a sum of absolute values of four corresponding correlation operation results (generated from the above differential correlations), and detect spectrum inversion in the input signal according to phases of the results of the first-order and third-order differential correlations.

It should be noted that the spectrum inversion determining apparatus 100 is not limited to processing an input signal that is an SOF of a DVB-S2 data frame. The foregoing determining process is applicable to any signal having a same nature (the in-phase component and the quadrature component of $S_{2j}$ have the same size and the same sign, and the in-phase component and the quadrature component of $s_{2j+1}$ have the same size and different signs).

For example, an input signal provided to the spectrum inversion determining apparatus 100 may further include a physical layer signaling code (PLSC) following an SOF of a DVB-S2 data frame, or only include a partial section of an SOF of a DVB-S2 data frame.

Tables in FIG. 3A and FIG. 3B show simulation results generated by an additive white Gaussian noise (AWGN) channel for different signal-to-noise ratios, where SR represents a symbol rate. In FIG. 3A and FIG. 3B "CFO" is defined as carrier frequency offset.

It is seen from the two tables that, when no spectrum inversion has occurred in an input signal, phases of one-order to four-order differential correlation results are rather small. When spectrum inversion has occurred in an input signal, the phase of the one-order and third-order differential correlation results are quite close to π. It is known from the simulation results that the spectrum inversion determining apparatus 100 of the present invention effectively determines whether spectrum inversion has occurred in an input signal.

Figure 4:
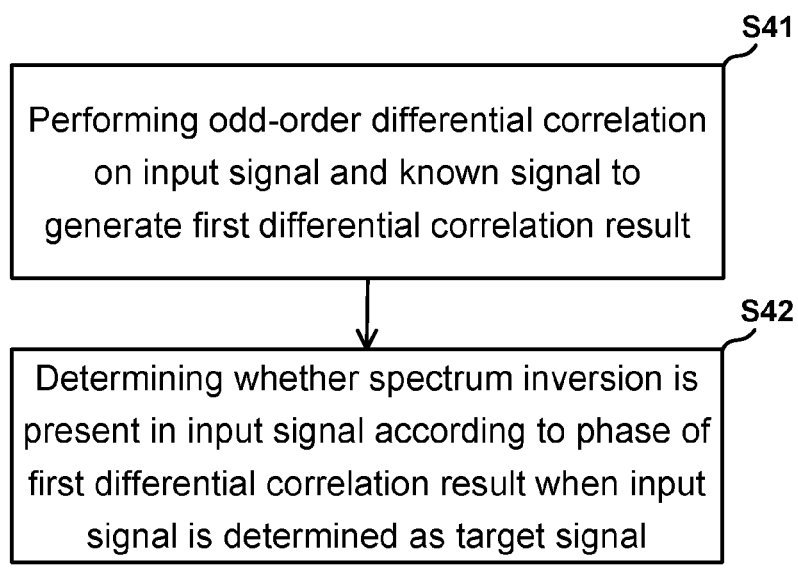
FIG. 4 is a flowchart of a spectrum inversion determining method according to an embodiment of the present invention.

FIG. 4 shows a flowchart of a spectrum inversion determining method according to another embodiment of the present invention. In Step S41, an m1-order differential correlation is performed on an input signal and a known signal (where m1 is an odd number) to generate a first differential correlation result $d_{m1}$:

$$d_{m1} = \sum_{i=m1}^{N-1} r_i^* s_i r_{i-m1} s_{i-m1}^*$$

In Step S42, when the input signal is determined as a target signal corresponding to the known signal, it is determined whether spectrum inversion is present in the input signal according to a phase of the first differential correlation result $d_{m1}$.

Details and modifications in descriptions associated with the spectrum inversion determining apparatus 100 of the foregoing embodiment (e.g., determining whether the input signal is the target signal before Step S42, performing two different odd-order differential correlations, and performing an odd-order and an even-order differential correlations) are applicable to the spectrum inversion determining method in FIG. 4, and shall be omitted herein.

In conclusion, an apparatus and method for detecting spectrum inversion is provided by the present invention. In the apparatus and method for detecting spectrum inversion of the present invention, an odd-order differential correlation is performed on an input signal, and it is determined whether spectrum inversion has occurred in the input signal according to the phase of the correlation result. The apparatus and method for detecting spectrum inversion of the present invention is applicable to not only a DVB-S2 compliant digital signal receiving end but also other systems with signals having similar characteristics.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for detecting spectrum inversion, comprising:
   a differential correlator, configured to perform an odd-order differential correlation on an input signal and a known signal to generate a first differential correlation result $d_{m1}$; and
   a determining module, coupled to the differential correlator, for detecting spectrum inversion in the input signal according to a phase of the first differential correlation result $d_{m1}$ when the input signal is determined as a target signal corresponding to the known signal.

2. The apparatus according to claim 1, wherein the determining module determines whether the input signal is the target signal according to an absolute value of the first differential correlation result $d_{m1}$.

3. The apparatus according to claim 1, wherein the odd-order differential correlation comprises:

$$d_{m1} = \sum_{i=m1}^{N-1} r_i^* s_i r_{i-m1} s_{i-m1}^*$$

where an order m1 is an odd number, the input signal and the known signal respectively comprise N symbols, $r_i$ represents an $i^{th}$ symbol in the input signal, $s_i$ represents an $i^{th}$ signal in the known signal, an in-phase component and a quadrature component of $S_{2j}$ have a same volume and a same sign, an in-phase component and a quadrature component of $S_{2j+1}$ have a same volume but different signs, N is an integer greater than 1, i represents an integer index between 0 to N−1, and j represents an integer index between 0 to N/2−1.

4. The apparatus according to claim 3, further comprising:
   a control module, for determining the order m1 employed by the differential correlator according to a channel environment passed by the input signal; wherein the control module selects the greater order m1 as the channel environment gets poorer.

5. The apparatus according to claim 1, wherein the differential correlator further generates a second differential correlation result $d_{m2}$ corresponding to a different odd-order; and the determining module detects the spectrum inversion in the input signal according to the phase of the first differential correlation result $d_{m1}$ and a phase of the second differential correlation result $d_{m2}$.

6. The apparatus according to claim 5, wherein the determining module determines whether the input signal is the target signal according to an absolute value of the first differential correlation result $d_{m1}$ and an absolute value of the second differential correlation result $d_{m2}$.

7. The apparatus according to claim 1, further comprising:
   an environment detecting module, for detecting a channel environment passed by the input signal to accordingly determine whether to generate a second differential correlation result $d_{m2}$ corresponding to a different odd-order;
   wherein, when a determination result of the environment detecting module is affirmative, the differential correlator generates the second differential correlation result $d_{m2}$; and the determining module detects the spectrum inversion in the input signal according to the phase of the first differential correlation result $d_{m1}$ and a phase of the second differential correlation result $d_{m2}$.

8. The apparatus according to claim 7, wherein the determining module determines whether the input signal is the target signal according to an absolute value of the first differential correlation result $d_{m1}$ and an absolute value of the second differential correlation result $d_{m2}$.

9. The apparatus according to claim 1, wherein the differential correlator further generates a third differential correlation result $d_{m3}$ corresponding to an even-order; and the determining module detects the spectrum inversion in the input signal according to a phase difference between the first differential correlation result $d_{m1}$ and the third differential correlation result $d_{m3}$.

10. The apparatus according to claim 9, wherein the determining module determines whether the input signal is the target signal according to an absolute value of the first differential correlation result $d_{m1}$ and an absolute value of the third differential correlation result $d_{m3}$.

11. The apparatus according to claim 1, wherein the input signal comprises a start of frame (SOF) of a Digital Video Broadcasting-Satellite-Second Generation (DVB-S2) data frame.

12. The apparatus according to claim 11, wherein the known signal comprises contents associated with the SOF of the DVB-S2 data frame.

13. The apparatus according to claim 1, being applicable to a digital baseband demodulating apparatus capable of receiving the input signal formed by phase shift keying.

14. A method for detecting spectrum inversion, comprising:
   a) performing an odd-order differential correlation on an input signal and a known signal to generate a first differential correlation result $d_{m1}$; and
   b) detecting spectrum inversion in the input signal according to a phase of the first differential correlation result $d_{m1}$ when the input signal is determined as a target signal corresponding to the known signal.

15. The method according to claim 14, between step (a) and step (b), further comprising:
   determining whether the input signal is the target signal according to an absolute value of the first differential correlation result $d_{m1}$.

16. The method according to claim 14, wherein the odd-order differential correlation comprises:

$$d_{m1} = \sum_{i=m1}^{N-1} r_i^* s_i r_{i-m1} s_{i-m1}^*$$

where an order m1 is an odd number, the input signal and the known signal respectively comprise N symbols, $r_i$ represents an $i^{th}$ symbol in the input signal, $s_i$ represents an $i^{th}$ signal in the known signal, an in-phase component and a quadrature component of $S_{2j}$ have a same volume and a same sign, an in-phase component and a quadrature component of $S_{2j+1}$ have a same volume but different signs, N is an integer greater than 1, i represents an integer index between 0 to N−1, and j represents an integer index between 0 to N/2−1.

17. The method according to 16, before step (a), further comprising:
   determining the order m1 employed in step (b) according to a channel environment passed by the input signal;
   wherein the determined order m1 determined gets larger as the channel environment gets poorer.

18. The method according to 14, wherein step (a) further comprises generating a second differential correlation result $d_{m2}$; and step (b) detecting the spectrum inversion in the input signal according to the phase of the first differential correlation result $d_{m1}$ and a phase of the second differential correlation result $d_{m2}$.

19. The method according to 18, between step (a) and step (b), further comprising:
   determining whether the input signal is the target signal according to an absolute value of the first differential correlation result $d_{m1}$ and an absolute value of the second differential correlation result $d_{m2}$.

20. The method according to 14, further comprising:
   determining whether to generate a second differential correlation result $d_{m2}$ corresponding to a different odd-order according to a channel environment passed by the input signal;
   wherein, step (b) comprises detecting the spectrum inversion in the input signal according to the phase of the first differential correlation result $d_{m1}$ and a phase of the second differential correlation result $d_{m2}$.

21. The method according to 20, between step (a) and step (b), further comprising:
   determining whether the input signal is the target signal according to an absolute value of the first differential correlation result $d_{m1}$ and an absolute value of the second differential correlation result $d_{m2}$.

22. The method according to 14, wherein step (a) further comprises generating a third differential correlation result $d_{m3}$ corresponding to an even-order; and step (b) detects the spectrum inversion in the input signal according to a phase difference between the first differential correlation result $d_{m1}$ and the third differential correlation result $d_{m3}$.

23. The method according to 22, between step (a) and step (b), further comprising:
   determining whether the input signal is the target signal according to an absolute value of the first differential correlation result $d_{m1}$ and an absolute value of the third differential correlation result $d_{m3}$.

24. The method according to 14, wherein the input signal comprises an SOF of a DVB-S2 data frame.

* * * * *